United States Patent [19]

Keller et al.

[11] Patent Number: 4,829,473
[45] Date of Patent: May 9, 1989

[54] PERIPHERAL CONTROL CIRCUITRY FOR PERSONAL COMPUTER

[75] Inventors: Glenn Keller, Los Gatos; Jay G. Miner, Mtn. View, both of Calif.

[73] Assignee: Commodore-Amiga, Inc., Los Gatos, Calif.

[21] Appl. No.: 886,614

[22] Filed: Jul. 18, 1986

[51] Int. Cl.⁴ .................... G06F 3/16; G10K 15/00
[52] U.S. Cl. .................... 364/900; 84/1.19; 84/1.01
[58] Field of Search ............. 364/200 MS File, 200, 364/900 MS File, 900, 190; 381/51; 84/1.01, 1.03, 1.11, 1.19

[56] References Cited

U.S. PATENT DOCUMENTS

| | | |
|---|---|---|
| 3,996,585 | 12/1976 | Hogan et al. |
| 4,034,983 | 7/1977 | Dash et al. |
| 4,053,740 | 10/1977 | Rosenthal |
| 4,070,710 | 1/1978 | Sukonick et al. |
| 4,126,893 | 11/1978 | Cronshaw et al. ............ 364/200 |
| 4,177,462 | 12/1979 | Chung |
| 4,180,805 | 12/1979 | Burson |
| 4,243,984 | 1/1981 | Ackley et al. |
| 4,296,476 | 10/1981 | Mayer et al. ............ 364/900 |
| 4,420,770 | 12/1983 | Rahman |
| 4,435,776 | 3/1984 | Ratcliffe et al. ............ 364/900 |
| 4,445,187 | 4/1984 | Best |
| 4,572,048 | 2/1986 | Franz et al. ............ 84/1.01 |
| 4,613,985 | 9/1986 | Hashimoto et al. ............ 381/51 |
| 4,667,556 | 5/1987 | Hanzawa et al. ............ 84/1.28 X |
| 4,700,322 | 10/1987 | Benbassat et al. ............ 381/51 X |
| 4,716,591 | 12/1987 | Masuzawa et al. ............ 381/51 |

OTHER PUBLICATIONS

"Amiga the Message is the Medium", by John J. Anderson, in Creative Computing, vol. 11, No. 9, pp. 32-41, 1985.

Primary Examiner—Gareth D. Shaw
Assistant Examiner—Paul Kulik
Attorney, Agent, or Firm—Finnegan, Henderson, Farabow, Garrett & Dunner

[57] ABSTRACT

A peripheral control circuit for a computer system. Independent control and interface circuits are provided for left and right audio channels, for a communications port, for storage media, and for joysticks or paddles. Control logic is provided for direct memory access to system memory and for interrupts to the processor by each of the peripherals. Sound data corresponding to a sound waveform during a particular time period is fetched using DMA or interrupts. Registers store data for selecting the output rate of the sound data, the length of the sound waveform, and the volume of the sound waveform. Four audio channels and two separate audio ports are provide.

32 Claims, 5 Drawing Sheets

PERIPHERAL CONTROL CIRCUITRY FOR PERSONAL COMPUTER

BACKGROUND OF THE INVENTION

This invention relates to the field of micro-circuits for video games and personal computers, especially those implemented in MOS (metal oxide semiconductor) technology where circuit implementation is provided with LSI chip size as a consideration. It further relates to the circuits used to control and interface peripheral devices in such a computer system where bus time is allocated and priority for bus accessing is a factor.

Dash, U.S. Pat. No. 4,034,983, shows a video game computer circuit with audio and pot interfacing. Dash's circuitry includes an analog mapping circuit for receiving input signals for a pair of paddle controls, an interface circuit, and a sound signal generator circuit for driving an audio speaker.

Best, U.S. Pat. No. 4,445,187, shows a video game circuit with an audio-dialog. A tape cartridge as opposed to a disk is interfaced to the circuit. Audio output circuits are implemented.

Sukonick, U.S. Pat. No. 4,070,710, shows a peripheral device (here a video display) control and interface circuit utilizing data bus and address bus architecture.

Other circuits have followed which have improved upon thses circuits to one degree or another.

SUMMARY OF THE INVENTION

An object of the present invention is to provide a peripheral control circuit which can be incorporated into a personal computer system and is compatible with address bus and data bus architecture, as well as direct memory access (DMA) where priority is established for bus access.

A second object of the invention is to provide a peripheral control circuit whose operating parameters are resettable by and from a system microprocessor and from memory via the bus architecture.

A further object of the invention is to package the various peripheral port control and interface circuit components by size and power consumption.

The objects of this invention are realized in a custom NMOS 48 pin chip capable of interfacing with the data bus architecture and address bus architecture of a host computer system which extensively uses direct memory access (DMA).

Independent control and interface circuits are provided for each of right and left audio channels, an information storage medium such as floppy disk, a communication port (UART), and up to four joy stick or paddle (pot) ports.

Each independent control and interface circuit is loaded with data from a data bus connection according to instructions placed at that data's destination.

A separate interrupt priority control and status circuit is dedicated to communication with a microprocessor in the host computer system. This microprocessor communication circuit is connected with each of the right and left audio channel circuits, the disk circuit, and the UART circuit.

A separate logic circuit communicates DMA requests from the audio and disk circuits to the host system.

BRIEF DESCRIPTION OF THE DRAWINGS

The invention will be better understood from a reading of the following detailed description of the preferred embodiment in conjunction with the accompanying drawings, in which.

DETAILED DESCRIPTION OF THE PREFERRED EMBODIMENT

The present invention provides an improved peripheral control circuit for use in a microprocessor driven personal computer system utilizing direct memory access (DMA) and incorporating address and data bus architecture. The invention provides audio, disk, UART (Universal Asynchronous Receiver/Transmitter) and controller port interfacing and control signal generation using less chip "real estate" and faster processing than found in other peripheral controllers. Queue and priority access enhance the duty cycle of the bus architecture. The architecture reduces inter-chip and intra-chip wiring, thereby reducing noise interference.

Figure 1:
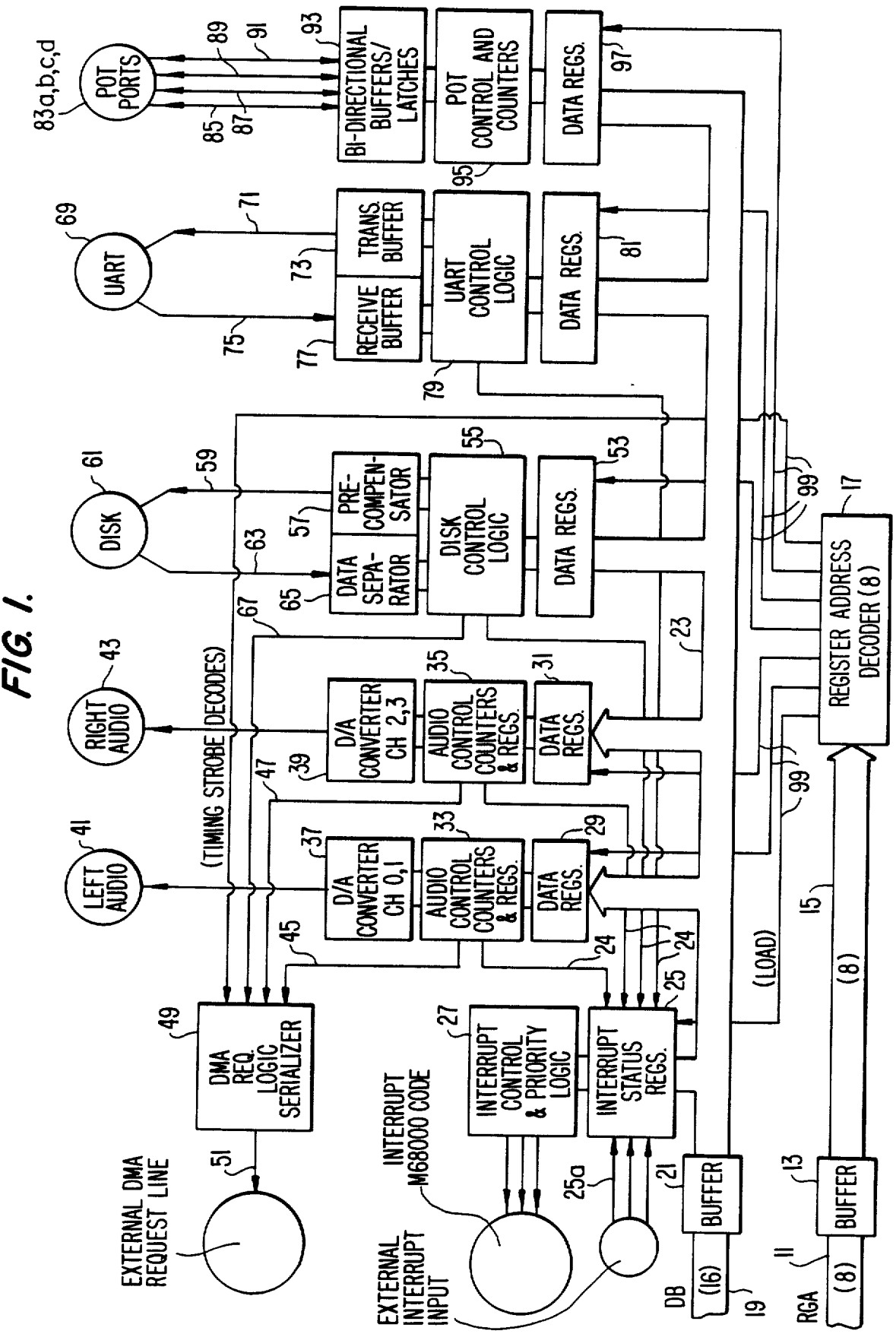
FIG. 1 is a block diagram of the peripheral device circuit chip.

FIG. 1 shows the circuitry for the present peripheral controller implemented on a single chip. An 8-bit wide register address (RGA) bus 11 provides an input to the chip through a first buffer 13. The buffer 13 loads addresses onto a continuation of the address bus 15 This continuation address bus 15 inputs 8-bit addresses into a register address decoder 17. The register address decoder 17 could be implemented on another circuit chip, but it is desirable to implement the register address decoder 17 on the same chip to cut down on wiring and on line noise pick-up. Data is received into the chip through a 16-bit wide data bus 19. A buffer register 21 in the chip transmits/receives the data and connects the bus 19 with a continuation data bus 23.

The invention is designed to operate with a plurality of 16-bit/32-bit microprocessor systems, including a personal computer system utilizing a Motorola 68000 microprocessor as its CPU. The system disclosed in two copending applications, entitled "Video Game and Personal Computer", Ser. No. 756,910, filed July 19, 1985, and entitled "Display Generator Circuitry for Personal Computer System," filed July 18, 1986, allowed Ser. No. 886,796, is such a system. The disclosure in these applications are incorporated by reference herein.

The chip includes interrupt status registers 25 connected to receive external interrupt input lines 25a, as would be provided by other peripheral devices in the system. The plurality of interrupt status registers 25 is connected to receive and send data to the data bus 23. The status registers 25 feed interrupt control and priority logic 27, which outputs interrupt code signals which are carried off the chip to the 68000 microporcessor.

A plurality of data registers 29, 31 are connected to receive data from the data bus 23. The data registers 29 are connected to control circuitry for the left audio channel, while the data registers 31 are connected to control circuitry for the right audio channel. Each of the data registers 29, 31 transfers its data into a plurality of audio control counters and registers 33 and 35, which in turn each drive an individual one of the digital to analog (D/A) converters 37, 39, of which there are four in all. The D/A converters 37 are connected to the output port 41 for the left audio channel, while D/A converters 39 are connected to the output port 43 for the right audio channel. Each of the audio control counter and register circuits 33 and 35 generate interrupt signals on lines 24, which are connected into the interrupt status registers 25. D/A converter circuits 37 and 39 are constructed according to known techniques. Each of the audio control counter and register circuits 33, 35 also provides a direct memory access request via the respective lines 45, 47 to a DMA request logic multiplexer (serializer) circuit 49. This DMA request logic circuit 49 provides an external DMA request signal on line 51 for direct memory access to system memory for additional data or instruction words. The lines 45, 47 carry timing strobe decode signals which act as DMA access requests to the DMA request logic circuit 49. While the left and right channel audio circuits are each represented as a single channel in FIG. 1, they actually include two channels each of which are mixed at the port, as will be described further below.

The disk controller includes data registers 53 connected to receive data and also load data onto the data bus 23. The data registers 53 transfer data with a disk control logic circuit 55. Disk control logic 55 is connected to a pre-compensator circuit 57 for sending signals to a disk port 61 via a connection line 59. Information received into the disk port 61 is transmitted via line 63 into a data separator circuit 65, which in turn is connected to the disk control logic 55. DMA access request lines 67 connect the disk control logic circuit 55 to the DMA request logic circuit 49. The disk control logic 55 also has interrupt signal lines 24 connected to the interrupt status registers 25.

UART port 69 is sent data via a line 71 from a transmit buffer circuit 73. UART port 69 provides data to a receive buffer circuit 77 via line 75. The transmit buffer 73 and receive buffer 77 are connected to a UART control logic circuit 79. UART control logic circuit 79 has interrupt signal connections 24 to the interrupt status registers 25. UART control logic circuit 79 likewise receives data from and transmits data to data registers 81. Data registers 81 provide two way access with data bus 23.

Four controller (pot) ports 83 *a, b, c, d* are connected via lines 85, 87, 89 and 91 to a bi-directional buffer and latch circuit 93. The buffer and latch circuit 93 is operated under the control of pot control and counters circuit 95, which communicates with the data bus 23 through data registers 97. The data registers 97 transfer data with the data bus 23.

The register address decoder 17 receives addresses via the address bus 15 generated by the microprocessor or by a register address encoder on an address generator chip. As a function of the address received, the decoder 17 provides an exclusive load enable signal on one of lines 99 to one of the registers 25, 29, 31, 53, 81 or 97 to cause the register to receive (load) or transmit (unload) data from or to the data bus 23, therby controlling which register communicates with the data bus 23 at any given point in time.

Figure 2:
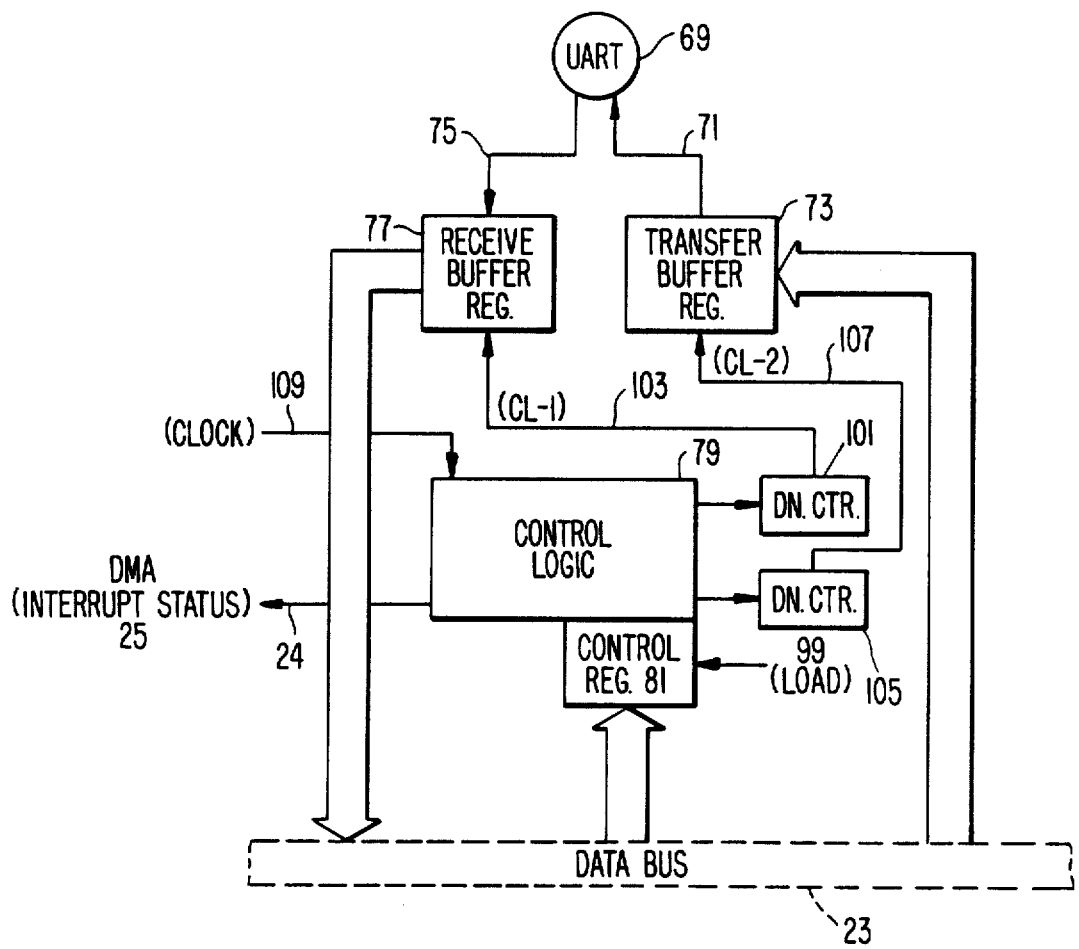
FIG. 2 is a block diagram of the UART port controller circuit.

The UART control circuitry, FIG. 2, operating in connection with port 69, transfers serial data via line 71 from the transfer buffer 73 to the port 69, and transfers data in serial form received at port 69 to the receive buffer 77 via line 75. Each buffer 73, 77 is driven to load and unload information under the control of clock pulses. The control register 81 and data transmit buffer register 73 receive parallel data from the data bus 23, while receive buffer register 77 sends parallel data to the bus 23.

The control logic 79 includes a first down counter 101 which develops first clock timing pulses on line 103 which are used to control information transfer into and out of the receive buffer register 77. A second down counter 105 is loaded from the control logic 79, which operates the transmit buffer register 73 at a second and different time from the receive buffer register 77. The control circuit 79 can be implemented as a general logic arithmetic unit, and is driven by an input on line 109 from the system clock of the host computer system. The control logic circuitry 79 also outputs interrupt signals on line 24.

The UART port 69 is a universal receiver and transmit port of the type commonly known in the industry as an "RS232" port. A system control signal places the circuitry in either the "read mode," i.e., receiving, or write mode, i.e., transmitting. The UART port 69 circuitry typically does not timeshare receive and transmit functions. The circuit alternatively controls the receive function or the transmit function, which are intermittent as the data rate is considerably slower than the system processing rate.

Figure 3:
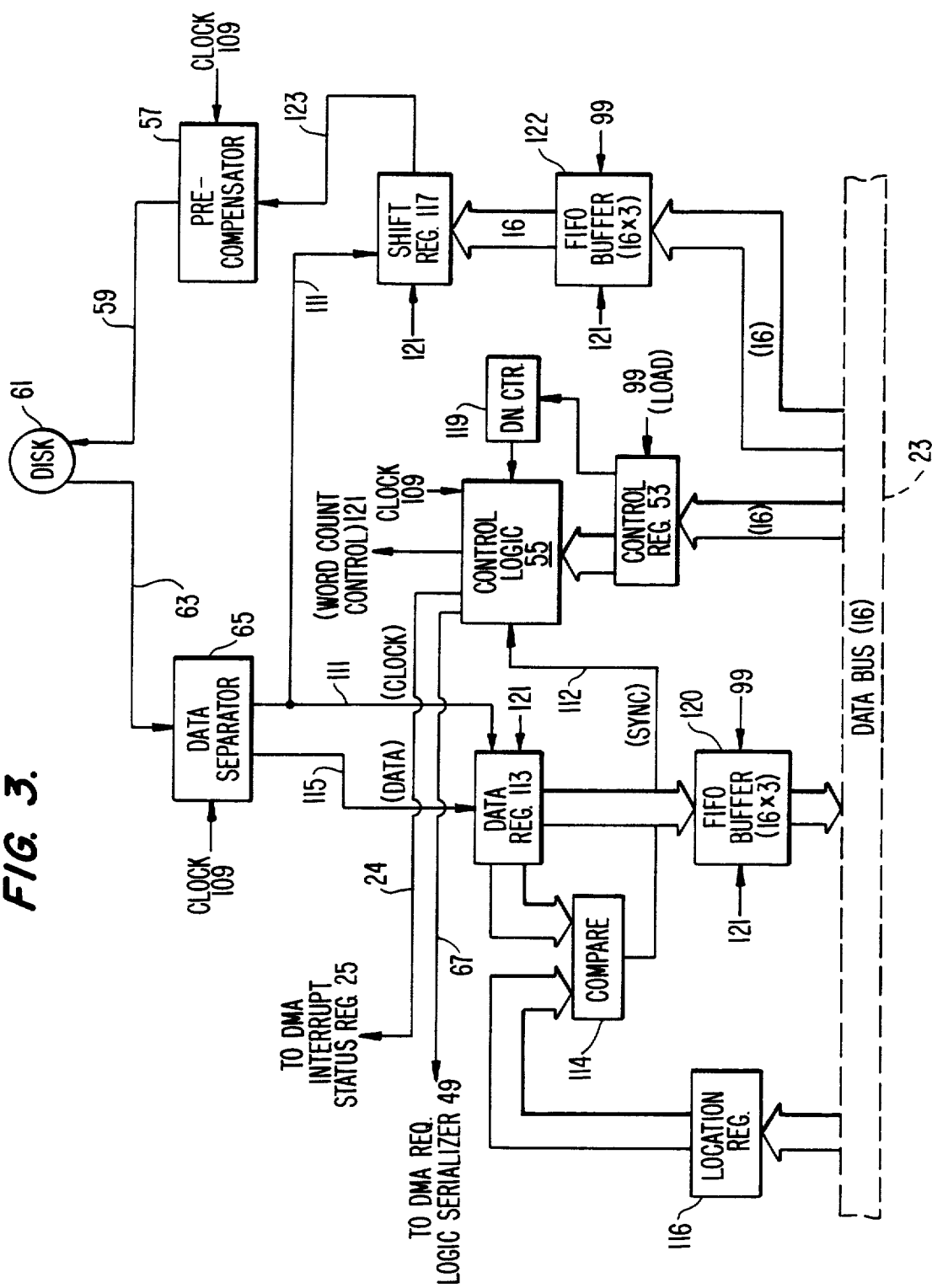
FIG. 3 is a block diagram of the disk port controller circuit.

The disk port 61 outputs serial data transferred from the precompensator circuit 57 (FIG. 3) via line 59. Serial data is input from the disk port 61 via line 63 to the data separator circuit 65. The system clock on line 109 is input into the disk control logic circuit 55 to control its operation, as well as to precompensator crcuit 57 and data separator circuit 65. The data separator circuit 65 creates a carry pulse on line 111 to an input data shift register 113 to control the transfer of data through the data shift register 113. Data is fed serially via line 115 from the data separator 65 to the data register 113. Data register 113 then transfers data to the data bus 23 in parallel format through a first-in, first-out buffer 120 which is three 16-bit registers deep. The FIFO buffer 120 is controlled by an enable signal line 99. A location register 116 is loaded from the data bus 23 under control of an enable line 99. This register 116 is 16-bits wide and holds a comparison value which is input to comparator 114 to be compared with the value in the data register 113. The output from the comparator 114 is a synch signal on line 112 to control logic 55 to provide the word count control signal output on line 121.

Another data shift register 117 receives data from the data bus 23 in 16-bit parllel transfers through a three 16-bit register deep FIFO buffer 122 which is controlled by an enable signal 99. A down counter 119 loaded from control register 53 provides a control instruction to the disk logic circuit 55 which in turn provides a control function via line 121 to the data shift registers 117 to control the word count transfer of information through the data shift register 113, the shift register 117 and the FIFO buffers 120, 122. Shift register 117 outputs serial data on the line 123 to the precompensator circuit 57. A precompensator circuit decodes the differences between successive bits of data as "zeros" and "ones" and introduces a phase shift to compensate for bit migration on the magnetic medium caused by the differences between magnetic attraction and repulsion of "zeros" and "ones". The pre-compensator circuit 57 provides a delay or acceleration of 0, 140 ns, 280 ns or 560 ns to individual pulses delivered to the disk port 61 to compensate for location migration on the disk medium. Register 117 receives carry pulses on line 111 from separator 65 which control the transfer rate of the register 117.

The control register 53 receives data from the data bus 23 in 16-bit parallel transfers and likewise transfers the information to the disk control logic circuit 55 under the control of an enbale signal on line 99 from the register address decoder 17. The disk control logic circuit 55 provides two interrupt status signals on lines 24 to the interrupt status registers 25 and three DMA request signals on lines 67 to the DMA request logic circuit 49 as previously discussed.

The pre-copmensator 57, shift register 117, and buffer 122 are utilized when writing information onto a disk through the port 61. The data separator 65, data shift register 113, and buffer 120 are used when reading information from a disk. Carry pulses on lines 111, generated by the separator 65, are used during both read and write operations.

The data separator circuit 65 operates in a complementary manner to the pre-compensator circuit 57 discussed above. This data separator sets up electronic inspection times for the data received as a function of the ideal data frequency rate. An inspection time period is called a "window" because it is the time during which the circuit "looks" for a data bit expected to be input. Due to irregularities in disk drives and data transmission and magnetic migration, i.e., "bit migration," on floppy disks, the data separator circuit is needed to track input data by shifting the window to compensate for frequency and phase errors in the arrival time of the data. A data input (separator) circuit is shown in U.S. Pat. No. 4,780,844, entitled "Data Input Circuit With Digital Phase Locked Loop," and is incorporated by reference herein.

Figure 4:
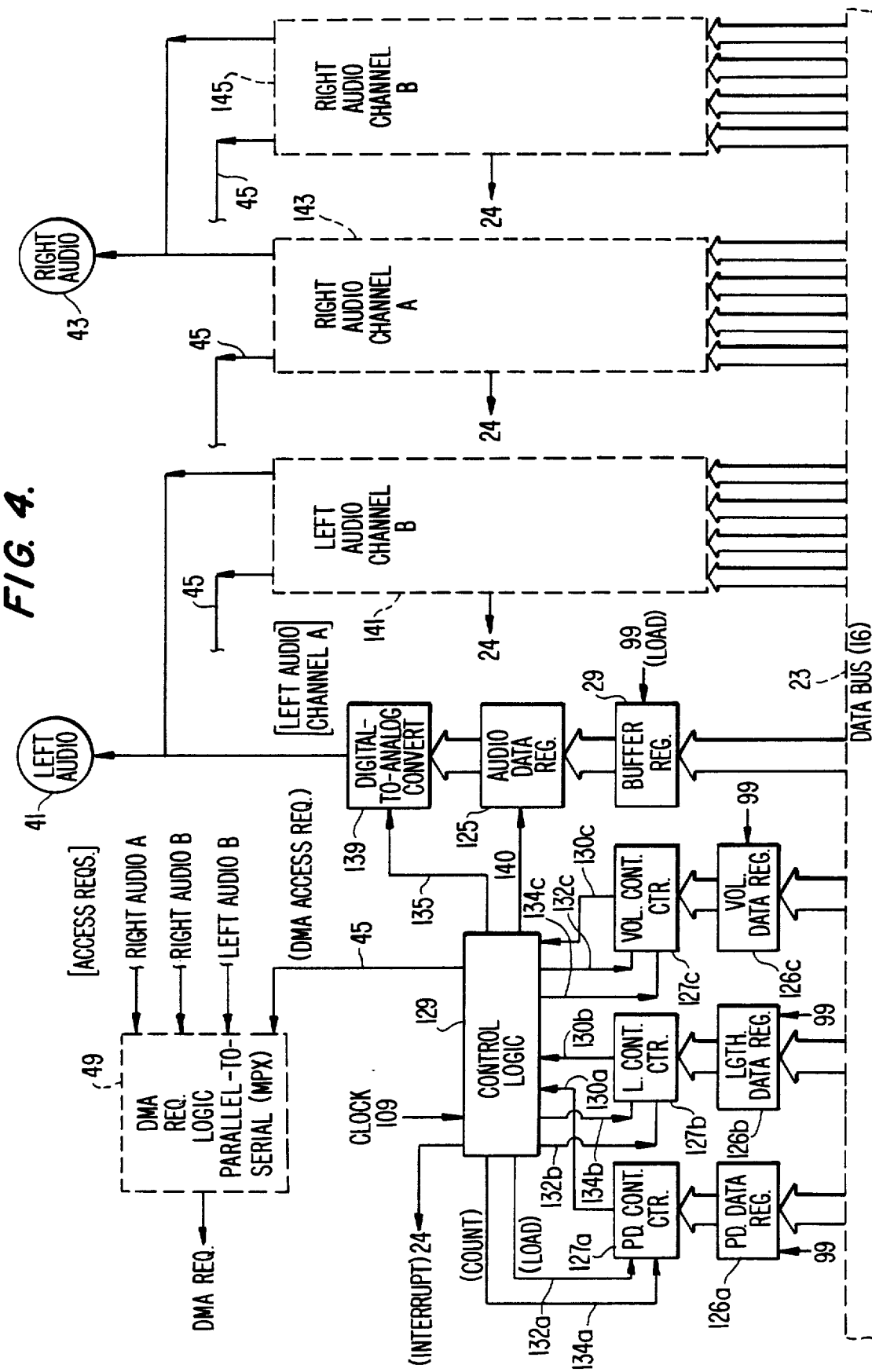
FIG. 4 is a detailed block diagram of the audio ports controller circuit.

The audio control circuitry, FIG. 4, is duplicated to generate the left side audio signals to port 41 and the right side audio signals to port 43. Each side audio circuit is made up of two channels, an A channel and a B channel, which contain identical circuitry.

The A channel for the left audio port 41 includes three sound control registers, register 126a for signal period, register 126b for duration, and register 126c for volume. The "period" data register 126a, "length" data register 126b, and "volume" data register 126c each receive data from the data bus 23 under the control of individual enable lines 99 and transfer data into "period," "length" and "volume" control counter 127a, 127b, and 127c. Period data contained in register 126a is tone frequency data, i.e., the frequency of the sound "note" generated. Length data contained in register 126b is the time duration of the tone. Volume data is the amplitude of the "note." This data is fed to control counters 127a, b, c which provide signals via lines 130a, b, c to the control logic 129. The load signal lines 132a, b, c control the loading of data into one of the control counters 127a, b, c. The count signal lines 134a, b, c control the serial readout of the data held in each control counter 127a, b, c.

The control logic 129 has an output control line 140 to the audio data register 125. This audio data register stores the data which defines the character of the music. As an example, perhaps the system is programmed to produce a middle "c" note. The data defining this note is held in the register 125. This register is then controlled by logic 129 to modify the period, length, and volume for the note.

Control logic circuit 129 receives the output 130a from "period" control counter 127a, the output 130b from "length" control counter 127b, and the output 130c from "volume" control counter 127c, and provides the load control signals on lines 132a, 132b, 132c and count control signals on lines 134a, 134b, 134c to the respective counters 127a, 127b, 127c. Control logic 129 provides an interrupt output on line 24 to status registers 25, and a DMA access request output on line 45 to DMA request logic parallel-to-serial multiplexer 49. The operation of the control logic 129 is clocked with system clock signals on line 109. The control logic circuit 129 can be implemented as a general logic arithmetic unit or by an instruction decoder logic circuit. The control logic 129 can also be implemented by a logic array network implemented in NAND gates.

Buffer register 29 is loaded with data from data bus 23 under control of an enable line 99. Buffer register 29 outputs to an audio data register 125 under control of line 140 from control logic 129. The information in the audio data register 125 is then output to a digital-to-analog converter 139. The control logic provides a control line 135 to this D-to-A converter 139. The analog output from the D-to-A converter 139 is the left audio channel A signal and is connected to the left audio port 41. This circuitry is duplicated to form the left audio channel circuit 141. The output of the B channel circuit 141 is similarly connected to port 41 so that the two audio signals are mixed.

Duplicate circuitry 143, 145 is used for the right audio A and B channels, respectively. The output lines from these circuits 143, 145 are likewise mixed by a common connection to the right audio port 43. Each of the circuits 141, 143, 145 have DMA request output lines 45 and interrupt signal lines 24 as outputs.

Figure 5:
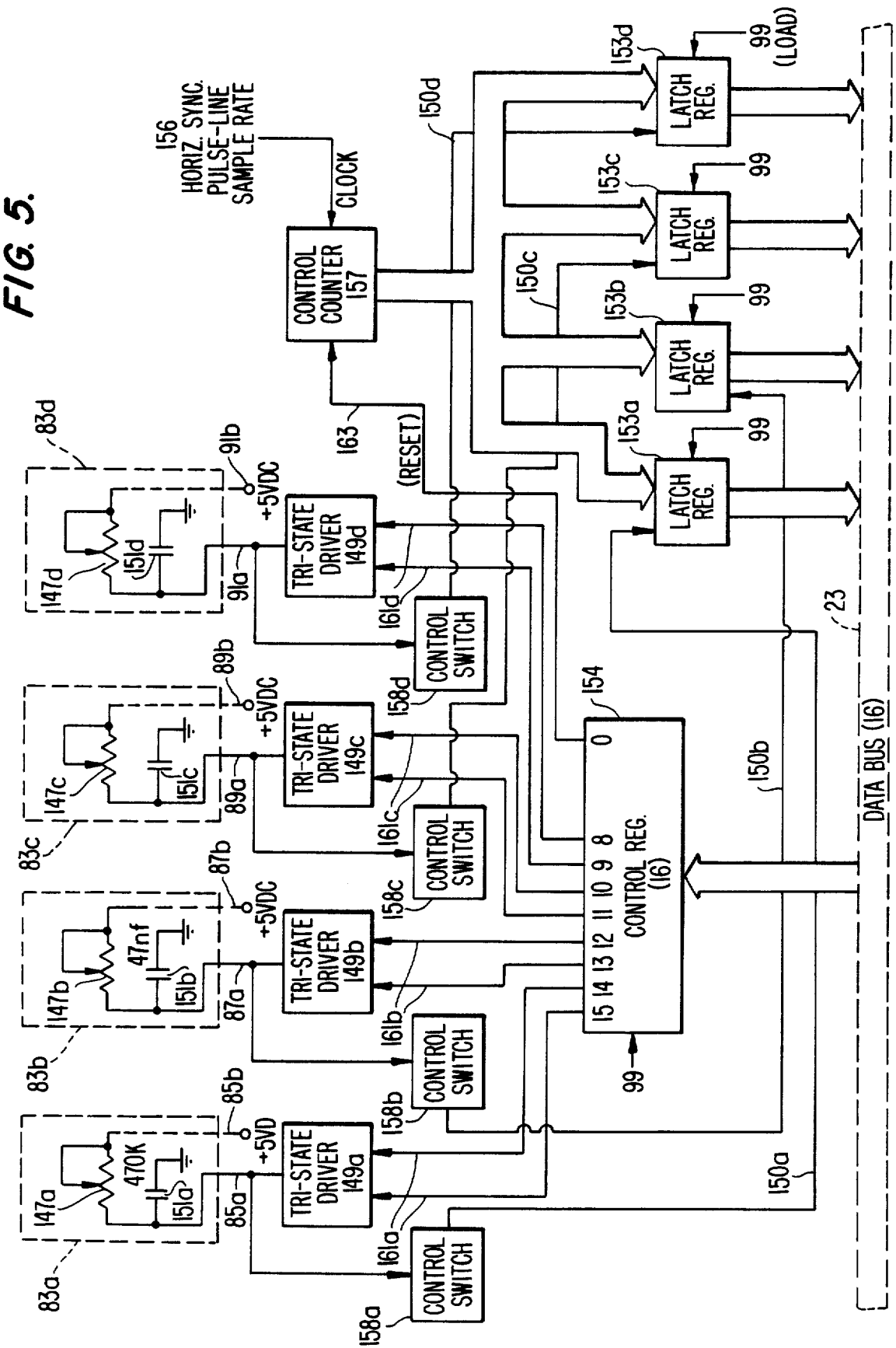
FIG. 5 is a detailed block diagram of the pot port controller circuit.

The controller (pot) port control circuitry 93, 95, and 97 of FIG. 1, with its connections 85, 87, 89 and 91 to the pot ports 83a, 83b, 83c, and 83d, can be implemented as shown in FIG. 5. Each of the four pot ports 83a, 83b, 83c, and 83d are identified in broken lines. The bi-directional lines 85, 87, 89, and 91 comprise the pairs 85a–85b, 87a–87b, 89a–89b, and 91a–91b as shown in FIG. 5. The lines 85a, 87a, 89a and 91a are signal level lines tied to tri-state drivers 149a, b, c, d. The lines 85b, 87b, 89b, and 91b are tied to a +5V DC voltage reference. A joystick circuit is shown within the pot port blocks 83a, 83b, 83c, and 83d. Each joystick circuit includes a variable 470K ohm resistor 147a, 147b, 147c and 147d and 47 microfarad capacitors 151a, 151b, 151c, and 151d connected to ground. The resistor and capacitor establish an RC time constant that is adjustable with the adjustment of the variable resistor.

A control register 154 is loaded from the data bus 23 under control of an enable signal on line 99. This control register feeds two different control bits on lines 161 to each individual one of four dedicated tri-state drivers for pot ports 83a, 83b, 83c and 83d. Bits nos. 15 and 14 of the control register 154 are output via lines 161a to a first tri-state driver circuit 149a. Bit nos. 13 and 12 of register 154 are output via lines 161b to a second tri-state driver circuit 149b, bit nos. 11 and 10 of register 154 are output via lines 161c to a third tri-state driver 149c, and bit nos. 9 and 8 of register 154 are output via lines 161d to a fourth tri-state driver circuit 149d. Each tri-state driver is a differential line driver with tri-state outputs. Such circuits have been supplied by many manufacturers, including Texas Instruments, Inc., for many years. These drivers can provide a +5V DC, OV DC, and intermediate level voltage output.

A control counter circuit 157 is clocked by the system video horizontal synch pulse on line 156, which provides the line scan sample rate of the video display to the control counter 157. Bit no. 0 of the control register 154 is output as the reset control 163 of the counter 157. The control register 154 instructs each of the tristate drivers 149a, 149b, 149c, and 149d when to switch its state to OV to drive down the signal on its respective pot port 83a, 83b, 83c and 83d and when to switch its state to allow the signal level to begin to rise. The RC time constant of the particular joystick will determine the rise time.

Individual control switches 158a, 158b, 158c, and 158d monitor respective ones of the lines 85a, 87a, 89a, and 91a. When a preset level is sensed, each control switch outputs a control signal 150a, 150b, 150c, and 150d to latch registers 153a, b, c, d. The output of the control counter 157 is simultaneously fed as data into latch registers 153a, 153b, 153c, and 153d, which are assigned one each to the pot ports 83a, 83b, 83c, and 83d. When a control signal 150 is received by a latch register 153, the respective register is loaded with the instantaneous value in control counter 157. In this manner, the analog position of each joystick variable resistor 147a, 147b, 147c, and 147d can be determined and is digitized into a (digital) value stored in the registers 153a, 153b, 153c, and 153d. The position of a joystick is translated into a signal value which operated the control switch 158. A control switch 158 then sets a latch register 153 to enable the value resident in the free running control counter 157 to be transfered into the latch register. In this manner the analog position of each joy stick is translated into a digital value which can be loaded onto the data bus 23.

The above description of the preferred embodiment is intended to be illustrative, and not to be read in a limiting sense. Changes can be made to the embodiment without departing from the features and scope of the invention.

What is claimed is:

1. A method for outputting an analog signal corresponding to a sound waveform from a personal computer system, wherein the personal computer system includes a processor, a system memory storing data, and an audio channel coupled to a data bus, and wherein the audio channel performs the following steps:
   storing audio period data in a period register coupled to the data bus in response to a first enable signal;
   storing the audio period data as a period count in a period counter coupled to the period register in response to a period load signal from a control circuit coupled to the period counter;
   changing the period count in the period counter in response to a period count control signal from the control circuit;
   providing a sound data control signal from the control circuit to a sound data register at a frequency determined by the period count;
   storing audio length data in a length register coupled to the data bus in response to a second enable signal;
   storing the audio length data as a length count in a length counter coupled to the length register and to the control circuit in response to a length load signal from the control circuit;
   changing the length count in the length counter in response to a length count control signal from the control circuit;
   providing a DMA access request from the control circuit to cause sound data stored in the system memory to be placed on the data bus, wherein the sound data corresponds to the sound waveform;
   storing the sound data corresponding to the sound waveform in the sound data register in response to the sound data control signal;
   converting the sound data corresponding to the sound waveform to an analog signal in a D-to-A converter coupled to the sound data register; and
   outputting the analog signal corresponding to the sound waveform from the D-to-A converter to an audio port.

2. A method in accordance with claim 1, and further comprising:
   storing audio volume data in a volume register coupled to the data bus and the control circuit in response to a third enable signal; and
   providing a converter control signal from the control circuit to the D-to-A converter in response to the audio volume data to control the amplitude of the analog signal.

3. A method in accordance with claim 2, wherein the personal computer system includes a plurality of audio channels coupled to a data bus, and further comprising:
   outputting a plurality of analog signals corresponding to a plurality of sound waveforms from a plurality of D-to-A converters to the audio port.

4. A method in accordance with claim 3, wherein the plurality of audio channels includes a first audio channel and a second audio channel, and further comprising:
   outputting a first analog signal corresponding to a first sound waveform from the first audio channel to a first audio port; and
   outputting a second analog signal corresponding to a second sound waveform from the second audio channel to a second audio port.

5. A method in accordance with claim 3, and further comprising:
   mixing together the plurality of analog signals for output to the audio port.

6. A method in accordance with claim 1, wherein the personal computer system includes a plurality of audio channels coupled to a data bus, and further comprising:
   outputting a plurality of analog signals corresponding to a plurality of sound waveforms from a plurality of D-to-A converters to the audio port.

7. A method in accordance with claim 6, wherein the plurality of audio channels includes a first audio channel and a second audio channel, and further comprising:
   outputting a first analog signal corresponding to a first sound waveform from the first audio channel to a first audio port; and
   outputting a second analog signal corresponding to a second sound waveform from the second audio channel to a second audio port.

8. A method in accordance with claim 6, and further comprising:
   mixing together the plurality of analog signals for output to the audio port.

9. An audio channel system for outputting an analog signal corresponding to a sound waveform in a personal computer system, wherein the personal computer system includes a processor, a system memory storing data, and a data bus coupled to the audio channel system, and wherein the audio channel system comprises:

period data storing means coupled to the data bus for storing audio period data in response to a first enable signal;

period counter means coupled to the period data storing means for storing a period count;

means coupled to the period counter means and responsive to a clock signal and the period count for changing the period count by providing a period load signal and a period count control signal to the period counter means;

sound data control means coupled to the period counter means for providing a sound data control signal at a frequency determined by the period count;

length data storing means coupled to the data bus for storing audio length data in response to a second enable signal;

length counter means coupled to the length data storing means for storing a length count;

means coupled to the length counter means and responsive to a clock signal and the length count for changing the length count by providing a length load signal and a length count control signal to the length counter means;

DMA access request means coupled to the period counter means and the length counter means for providing a DMA access request to cause sound data stored in the system memory to be placed on the data bus, wherein the sound data corresponds to the sound waveform;

sound data storing means coupled to the sound data control means for storing the sound data corresponding to the sound waveform in response to the second data control signal;

D-to-A converter means coupled to the sound data storing means for converting the sound data corresponding to the sound waveform to an analog signal; and means for outputting the analog signal corresponding to the sound waveform from the D-to-A converter means to an audio port.

10. An audio channel system in accordance with claim 9, and further comprising:

volume data storing means coupled to the data bus for storing audio volume data in response to a third enable signal; and volume control means coupled to the volume data storing means for providing a converter control signal to the D-to-A converter means to control the amplitude of the analog signal.

11. An audio channel system in accordance with claim 10, in which the audio channel system includes a plurality of audio channels for outputting a plurality of analog signals corresponding to a plurality of sound waveforms to the audio port.

12. An audio channel system in accordance with claim 11, in which the audio channel system comprises:

a first audio channel for outputting a first analog signal corresponding to a first sound waveform to a first audio port; and a second audio channel for outputting a second analog signal corresponding to a second sound waveform to a second audio port.

13. An audio channel system in accordance with claim 11, and further comprising:

means for mixing together the plurality of analog signals for output to the audio port.

14. An audio channel system in accordance with claim 9, in which the audio channel system includes a plurality of audio channels for outputting a plurality of analog signals corresponding to a plurality of sound waveforms to the audio port.

15. An audio channel system in accordance with claim 14, in which the audio channel system comprises:

a first audio channel for outputting a first analog signal corresponding to a first sound waveform to a first audio port; and a second audio channel for outputting a second analog signal corresponding to a second sound waveform to a second audio port.

16. An audio channel system in accordance with claim 14, and further comprising:

means for mixing together the plurality of analog signals for output to the audio port.

17. A method for outputting an analog signal corresponding to a sound waveform from a personal computer system, wherein the personal computer system includes a processor, a system memory storing data, and an audio channel coupled to a data bus, and wherein the audio channel performs the following steps:

storing audio period data in a period register coupled to the data bus in response to a first enable signal;

storing the audio period data as a period count in a period counter coupled to the period register in response to a period load signal from a control circuit coupled to the period counter;

changing the period count in the period counter in response to a period count control signal from the control circuit;

providing a sound data control signal from the control circuit to a sound data register at a frequency determined by the period count;

storing audio length data in a length register coupled to the data bus in response to a second enable signal;

storing the audio length data as a length count in a length counter coupled to the length register and to the control circuit in response to a length load signal from the control circuit;

changing the length count in the length counter in response to a length count control signal from the control circuit;

providing an interrupt request from the control circuit to cause sound data stored in the system memory to be placed on the data bus, wherein the sound data corresponds to the sound waveform;

storing the sound data corresponding to the sound waveform in the sound data register in response to the sound data control signal;

converting the sound data corresponding to the sound waveform to an analog signal in a D-to-A converter coupled to the sound data register; and outputting the analog signal corresponding to the sound waveform from the D-to-A converter to an audio port.

18. A method in accordance with claim 17, and further comprising:

storing audio volume data in a volume register coupled to the data bus and the control circuit in response to a third enable signal; and providing a converter control signal from the control circuit to the D-to-A converter in response to the audio volume data to control the amplitude of the analog signal.

19. A method in accordance with claim 18, wherein the personal computer system includes a plurality of audio channels coupled to a data bus, and further comprising:
   outputting a plurality of analog signals corresponding to a plurality of sound waveforms from a plurality of D-to-A converters to the audio port.

20. A method in accordance with claim 19, wherein the plurality of audio channels includes a first audio channel and a second audio channel, and further comprising:
   outputting a first analog signal corresponding to a first sound waveform from the first audio channel to a first audio port; and
   outputting a second analog signal corresponding to a second sound waveform from the second audio channel to a second audio port.

21. A method in accordance with claim 19, and further comprising:
   mixing together the plurality of analog signals for output to the audio port.

22. A method in accordance with claim 17, wherein the personal computer system includes a plurality of audio channels coupled to a data bus, and further comprising:
   outputting a plurality of analog signals corresponding to a plurality of sound waveforms from a plurality of D-to-A converters to the audio port.

23. A method in accordance with claim 22, wherein the plurality of audio channels includes a first audio channel and a second audio channel, and further comprising:
   outputting a first analog signal corresponding to a first sound waveform from the first audio channel to a first audio port; and
   outputting a second analog signal corresponding to a second sound waveform from the second audio channel to a second audio port.

24. A method in accordance with claim 22, and further comprising:
   mixing together the plurality of analog signals for output to the audio port.

25. An audio channel system for outputting an analog signal corresponding to a sound waveform in a personal computer system, wherein the personal computer system includes a processor, a system memory storing data, and a data bus coupled to the audio channel system, and wherein the audio channel system comprises:
   period data storing means coupled to the data bus for storing audio period data in response to a first enable signal;
   period counter means coupled to the period data storing means for storing a period count;
   means coupled to the period counter means and responsive to a clock signal and the period count for changing the period count by providing a period load signal and a period count control signal to the period counter means;
   sound data control means coupled to the period counter means for providing a sound data control signal at a frequency determined by the period count;
   length data storing means coupled to the data bus for storing audio length data in response to a second enable signal;
   length counter means coupled to the length data storing means for storing a length count;
   means coupled to the length counter means and responsive to a clock signal and the length count for changing the length count by providing a length load signal and a length count control signal to the length counter means;
   interrupt request means coupled to the period counter means and the length counter means for providing an interrupt request to cause sound data stored in the system memory to be placed on the data bus by the processor, wherein the sound data corresponds to the sound waveform;
   sound data storing means coupled to the sound data control means for storing the sound data corresponding to the sound waveform in response to the sound data control signal;
   D-to-A converter means coupled to the sound data storing means for converting the sound data corresponding to the sound waveform to an analog signal; and
   means for outputting the analog signal corresponding to the sound waveform from the D-to-A converter means to an audio port.

26. An audio channel system in accordance with claim 25, and further comprising:
   volume data storing means coupled to the data bus for storing audio volume data in response to a third enable signal; and
   volume control means coupled to the volume data storing means for providing a converter control signal to the D-to-A converter means to control the amplitude of the analog signal.

27. An audio channel system in accordance with claim 26, in which the audio channel system includes a plurality of audio channels for outputting a plurality of analog signals corresponding to a plurality of sound waveforms to the audio port.

28. An audio channel system in accordance with claim 27, in which the audio channel system comprises:
   a first audio channel for outputting a first analog signal corresponding to a first sound waveform to a first audio port; and
   a second audio channel for outputting a second analog signal corresponding to a second sound waveform to a second audio port.

29. An audio channel system in accordance with claim 27, and further comprising:
   means for mixing together the plurality of analog signals for output to the audio port.

30. An audio channel system in accordance with claim 25, in which the audio channel system includes a plurality of audio channels for outputting a plurality of analog signals corresponding to a plurality of sound waveforms to the audio port.

31. An audio channel system in accordance with claim 30, in which the audio channel system comprises:
   a first audio channel for outputting a first analog signal corresponding to a first sound waveform to a first audio port; and
   a second audio channel for outputting a second analog signal corresponding to a second sound waveform to a second audio port.

32. An audio channel system in accordance with claim 30, and further comprising:
   means for mixing together the plurality of analog signals for output to the audio port.

* * * * *